(12) United States Patent
Schoonover et al.

(10) Patent No.: US 9,914,255 B2
(45) Date of Patent: *Mar. 13, 2018

(54) METHOD FOR MAKING MULTIPLE DUROMETER SEALS

(71) Applicant: Vintech Industries, Inc., Imlay City, MI (US)

(72) Inventors: James Schoonover, Shelby Township, MI (US); Vincent McNish, Fostoria, MI (US)

(73) Assignee: Vintech Industries, Inc., Imlay City, MI (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/926,577

(22) Filed: Oct. 29, 2015

(65) Prior Publication Data
US 2016/0046056 A1     Feb. 18, 2016

Related U.S. Application Data

(63) Continuation-in-part of application No. 14/211,651, filed on Mar. 14, 2014, now Pat. No. 9,321,209.
(Continued)

(51) Int. Cl.
B29C 47/06     (2006.01)
B29C 47/00     (2006.01)
(Continued)

(52) U.S. Cl.
CPC ............ *B29C 47/06* (2013.01); *B29C 47/003* (2013.01); *B29C 47/0014* (2013.01); *B29C 47/0023* (2013.01); *B29C 47/0047* (2013.01); *B29C 47/0066* (2013.01); *B29C 47/8815* (2013.01); *B29C 47/8895* (2013.01); *B29C 47/90* (2013.01); *B29C 47/0004* (2013.01); *B29C 47/0052* (2013.01); *B29C 47/026* (2013.01); *B29C 47/802* (2013.01); *B29C 47/884* (2013.01); *B29C 47/8835* (2013.01);
(Continued)

(58) Field of Classification Search
None
See application file for complete search history.

(56) References Cited

U.S. PATENT DOCUMENTS 5,411,785 A * 5/1995 Cook .................. B29C 47/0004
                                                        428/122
5,788,901 A * 8/1998 Barnard .................. B29C 43/26
                                                        264/165

* cited by examiner

Primary Examiner — Monica Huson
(74) Attorney, Agent, or Firm — Warn Partners, P.C.

(57) ABSTRACT

Method for making multiple durometer bulb seals and any other types of multiple durometer seals and moldings includes cooling separately at least one structural member and at least one sealing portion, which have different durometers and shapes. At least a first extrusion is drawn through an extruder, forming a structural member profile and the extruded material is pulled along a longitudinal axis to a first calibrator device and first cooling tank to cool the structural member profile to a predetermined temperature. Cooling medium directly contacts the outer and inner surfaces of the first profile. Downstream, the sealing portion is extruded and affixed onto the cooled structural member and pulled further downstream to a second calibrator device and through a second cooling tank to cool the final profile a predetermined amount. Disparity in cooling expansion and cooling differential between the multiple durometers and shapes is avoided or overcome.

18 Claims, 3 Drawing Sheets

Related U.S. Application Data

(60) Provisional application No. 61/793,400, filed on Mar. 15, 2013.

(51) Int. Cl.
*B29C 47/88* (2006.01)
*B29K 101/12* (2006.01)
*B29L 31/30* (2006.01)
*B29L 31/26* (2006.01)
*B29K 227/06* (2006.01)
*B29K 21/00* (2006.01)
*B29K 23/00* (2006.01)
*B29K 55/02* (2006.01)
*B29C 47/80* (2006.01)
*B29C 47/90* (2006.01)
*B29C 47/02* (2006.01)

(52) U.S. Cl.
CPC .......... *B29C 47/905* (2013.01); *B29C 47/908* (2013.01); *B29C 2793/0027* (2013.01); *B29K 2021/003* (2013.01); *B29K 2023/12* (2013.01); *B29K 2055/02* (2013.01); *B29K 2101/12* (2013.01); *B29K 2227/06* (2013.01); *B29L 2031/265* (2013.01); *B29L 2031/302* (2013.01)

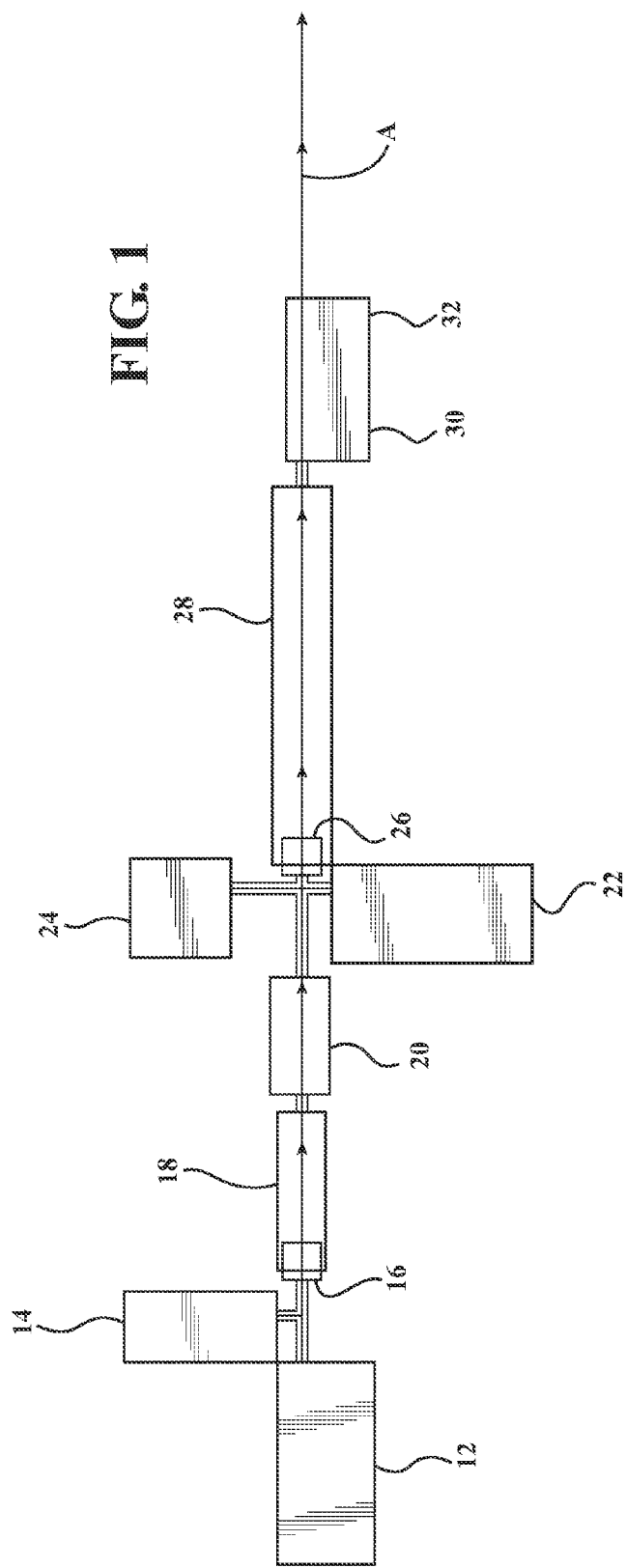
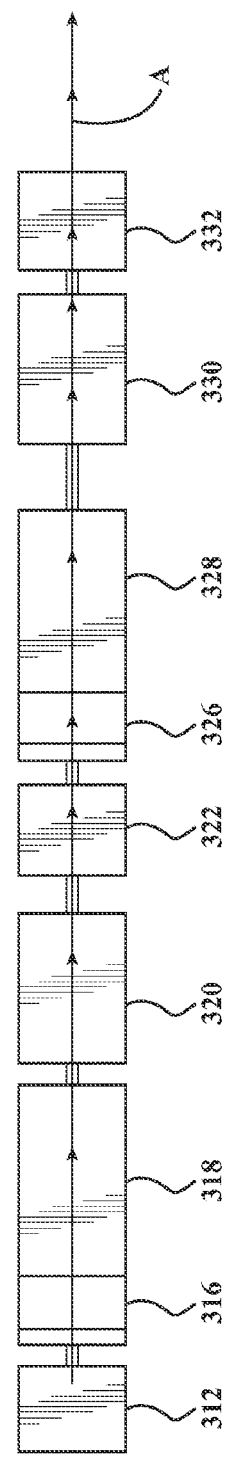

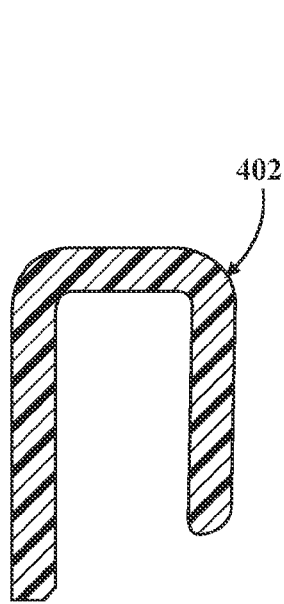
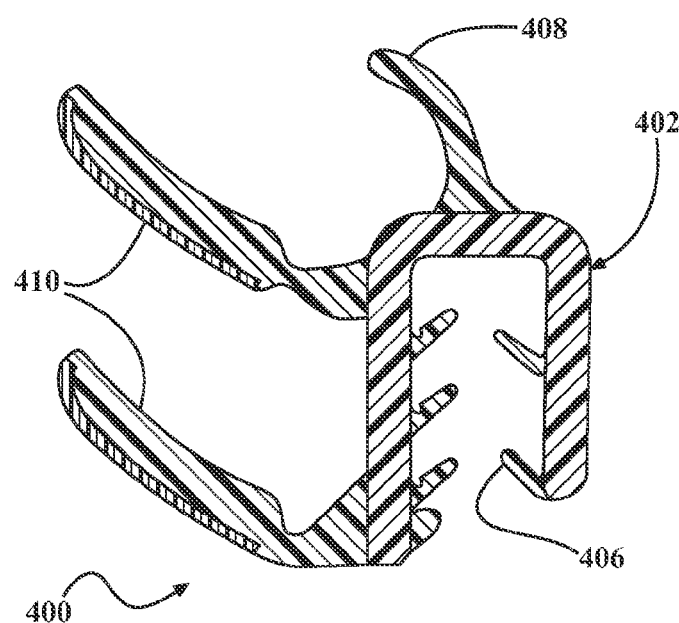
FIG. 5A
FIG. 5B
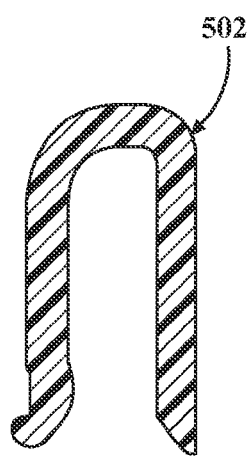
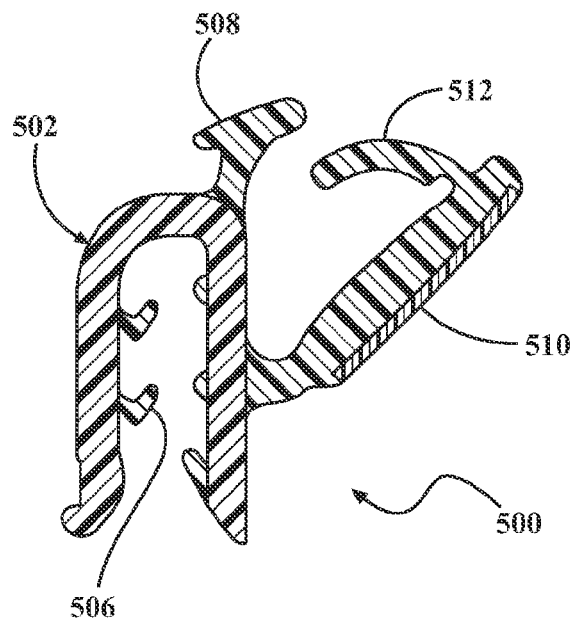
FIG. 6A
FIG. 6B

METHOD FOR MAKING MULTIPLE DUROMETER SEALS

CROSS-REFERENCE TO RELATED APPLICATIONS

The instant application is a continuation-in-part of U.S. patent application Ser. No. 14/211,651, filed Mar. 14, 2014, which claims the benefit of U.S. Provisional Application No. 61/793,400, filed Mar. 15, 2013. The disclosure of the above applications are incorporated herein by reference

FIELD OF THE INVENTION

The present invention is directed to a process for manufacture of a weather strip which is used for attachment to a vehicle for providing a seal.

BACKGROUND OF THE INVENTION

Resilient bulb seals, lip type seals and trims are generally known and are commonly used for automobile window, trunk, and/or door sealing and trimming and are often placed along the abutting edges of parts. Another one of such applications is found in the field of mobile living quarters having extendable or slide-out rooms for providing a seal between the body panel of the recreational vehicle and the extendable room frame. A bulb seal is commonly placed along the interface between the abutting surfaces of parts to prevent water, debris, and excessive air drafts from entering the interior of the automobile and/or mobile living quarters from the outside. This seal often includes at least two sub-parts; a bulb portion and a structural member, each generally extending along a side of an opening of the motor vehicle. The structural member comprising a mounting portion is typically placed along the edge of the motor vehicle part to mount the seal to the part, and the bulb portion extends therefrom to form a resilient seal between the abutting edges of the motor vehicle parts around the outside edge of the opening. Optionally, at least one flange seal can additionally be used adjacent the opening so as to provide contact for additional interface between various surfaces of parts to prevent water, debris, and excessive air drafts from entering, e.g., placed along the edge of the sidewall and flexibly protrudes against the adjacent sidewall of the slide-out room so as to be in constant contact with the sidewall at all positions of the room between its open and closed positions.

Generally, using materials with different durometers is desirable for providing the respective mounting and sealing functions. Typically, the mounting portion has a greater stiffness and higher durometer than the bulb portion for installation and providing structural strength to help prevent the bulb seal from disengaging from the part edge and falling off.

Bulb seals and lip type seals are conventionally made by a co-extrusion process where the mounting portion and bulb portion are co-extruded forming an extruded strip of continuous length. This extruded strip is then delivered to a bath or trough containing cooled water to cool the extrusion. After passing through the bath the strip is usually trimmed and then cut into a desired length to form the finished bulb seal. One of the problems with this type of conventional process for making bulb seals is that due to the different durometers and the pre-cut length of continuous extruded material the mounting portion and bulb portion have different cooling rates. The continuous pre-cut extrusion strip prevents the cool water from entering the inside length of the bulb since there is no open end until after the seals are cut to their desired length after exiting the trough, thus, the bulb portion cannot additionally be effectively cooled from the inside. However, the mounting portion typically not only has a different material and higher durometer with a different cooling rate than the bulb portion, but also, unlike the bulb portion, does allow the cool water to enter the inside mounting portion due to its typical C or U-like shape. The resultant cooling differentials adversely affect part dimensions, tolerances, part integrity, and other material and structural properties of the finished bulb seal. Any other portions having different durometers and shapes also have resultant cooling differentials. Another typical problem caused by the differential cooling and deficient conventional processing is that the legs or walls of the mounting portion become curved, wavy, scratched, and/or otherwise compromised. Typical co-extrusion dies and processing steps have attempted unsuccessfully to overcompensate for the problem of uneven cooling and/or cooling cycle time variations additionally causing further processing issues, complexity, perpetual adjustments, e.g., equipment speed adjustment, and additional costs.

Therefore, it is desirable to have a method for making various types of multiple durometer seals, that helps to avoid or overcome the disparity in the cooling expansion and cooling differential between the multiple durometers. It is also desirable to have improved quality multiple durometer seals, without adversely affecting or compromising their rigid carriers or mounting portion and tolerances.

SUMMARY OF THE INVENTION

The present invention is directed to a method for making multiple durometer bulb seals and other types of seals usable for attachment to motor vehicles. Generally, the method for making multiple durometer seals includes forming at least one structural member and at least one sealing portion, e.g., bulb, fin, flange, grip, and/or lip, coupled thereto. The method includes providing an upstream portion including at least one first main extruder, at least one first calibrator device, and at least one first cooling tank, to form the at least one structural member and provide a cooling medium flow thereto. The method further includes additionally providing a downstream portion including at least one downstream extruder, at least one second calibrator device, at least one second cooling tank, and at least one pulling device located upstream from at least one cutting device, to form the at least one sealing portion and provide a cooling medium flow thereto. Preferably, the method is performed with in-line processing steps upstream to downstream arranged generally along the longitudinal axis with pulled material moving in a forward direction toward the at least one cutting device. The present invention helps to avoid or overcome the disparity in the cooling expansion and cooling differential between the multiple durometers of the seals, e.g., between the durometer of the structural member and the durometer of the sealing portion, by cooling separately the at least one structural member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic illustration depicting a process for making multiple diameter bulb seals, according to the present invention;

FIG. 4 is a schematic illustration depicting a process for making multiple diameter seals, according to another embodiment of the present invention;

FIG. 5A is a front elevation view of an exemplary doorbelt upstream profile according to the present invention;

FIG. 5B is a front elevation view of the exemplary doorbelt of FIG. 5A after downstream application of features according to the present invention;

FIG. 6A is a front elevation view of another exemplary doorbelt upstream profile according to another embodiment of the present invention; and FIG. 6B is a front elevation view of the exemplary doorbelt of FIG. 6A after downstream application of features according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 2:
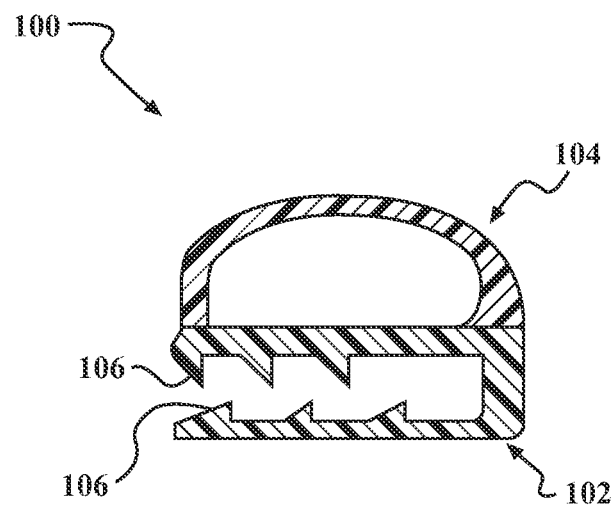
FIG. 2 is a front elevation view of a multiple durometer bulb seal, in accordance with the present invention.
Figure 3:
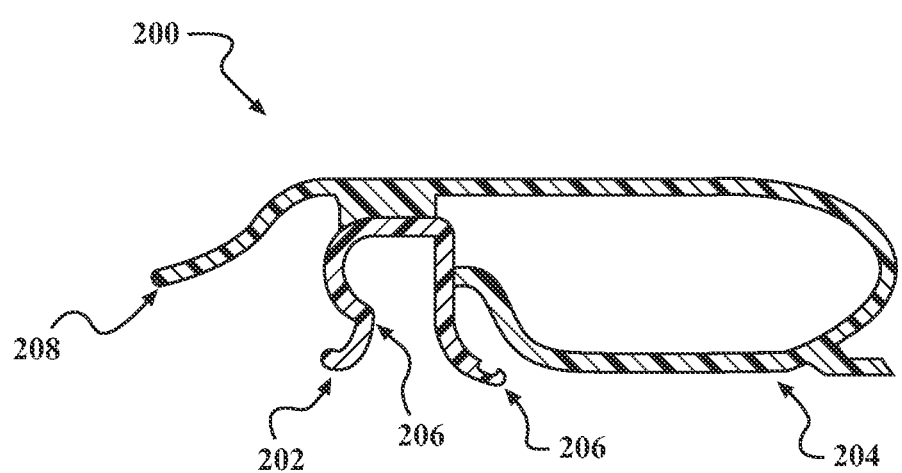
FIG. 3 is a front elevation view of a multiple durometer bulb seal, in accordance with the present invention.

Referring to FIGS. 1-3 generally, the method for making multiple durometer bulb seals in accordance with the present invention comprises providing an upstream to downstream arrangement comprising at least one first main extruder 12, at least one secondary extruder 14, at least one first calibrator device 16, at least one first cooling tank 18, at least one first pulling device 20, and at least one cutting device 32. Typically, the method is performed with in-line processing steps arranged generally along a longitudinal axis A.

The method further comprises additionally providing at least one downstream extruder 22, at least one secondary downstream extruder 24, at least one second calibrator device 26, at least one second cooling tank 28, and at least one second pulling device 30, located upstream to the at least one cutting device 32. Preferably, the method is performed with in-line processing steps upstream to downstream arranged generally along the longitudinal axis A with pulled material moving in a forward direction toward the at least one cutting device 32, as indicated generally by the arrows along axis A in FIG. 1.

FIG. 2 depicts a bulb seal of the present invention, generally shown at 100 comprising a structural member, generally shown at 102, and a bulb portion, generally shown at 104, manufactured in accordance with the method of the present invention. The structural member 102 is generally U-shaped for mounting to a component therein and can further optionally comprise a plurality of retention members 106 for receiving mounting features of the motor vehicle part edge or flange. The retention members 106 can comprise opposing offset and angled barbs, protrusions, and the like for gripping mounting features of the motor vehicle component edge or flange. The bulb portion 104 is extruded onto the structural member 102 such that a sealing function is provided by the bulb portion 104 in contact with a motor vehicle surface relative to an opening to help prevent moisture and debris from entering through the motor vehicle opening. The structural member 102 has a higher durometer than the bulb portion 104.

FIG. 3 depicts a bulb seal, generally shown at 200 comprising a structural member, generally shown at 202, and a bulb portion, generally shown at 204. The structural member 202 is generally C-shaped or U-shaped for mounting to a motor vehicle part therein and comprises retention members, generally shown at 206, for receiving and retaining mounting features of the motor vehicle part edge or flange. The bulb portion 204 is extruded onto a first side and/or outer surface of the structural member 202 such that a sealing function is provided by the bulb portion 204 in contact with a motor vehicle surface relative to an opening to help prevent moisture and debris from entering through the opening. Additionally, at least one flange seal, generally shown at 208, is extruded onto a second side and/or top surface of the retention member 202 and extends away from the bulb portion 204 to provide a second sealing function.

The structural member 202 has a higher durometer than the bulb portion 204 and flange seal 208. Most preferably, the structural member 202 has a higher durometer than at least the bulb portion 204. Alternatively, the bulb portion 204 can additionally have a lower durometer than the flange seal 208. One application of the bulb seal 200 is found in the field of mobile living quarters having slide-out rooms. The flange seal 208 can be in sliding contact with one of the sidewalls thereof and is made of a material which is rigid enough to ensure that the flange seal 208 remains in contact with the side wall of the slide-out room as the slide-out room is extended or retracted.

It is within the contemplation of the invention that the bulb portion 204 and flange seal 208 can generally have the same durometer. It is also understood that alternative extruded structural member and bulb portion arrangements suitable for mounting and sealing may be used, in particular, suitable shapes and configuration for providing a channeled structural mounting feature and a bulb sealing configuration including a lower durometer than the structural member.

Generally, the extruded materials are polypropylene, thermoplastic elastomer, soft TPE (Thermoplastic Elastomer), rigid PVC, flexible PVC, PVC vinyl, PVC rubber, ABS. Typically, the support member 102,202 is made from a structural ABS (Acrylonitrile Butadiene Styrene), polypropylene, or other plastic material suitable for providing a rigid structural member in accordance with the present invention. Typically, the bulb portion 104,204 is made from TPE, and optionally, co-extruded slip coated or other plastic material suitable for providing a resilient seal. Preferably, the extruded materials are compatible material to melt bond to one another under pressure.

Referring to the Figures generally, in more particularly to FIG. 1, the first main extruder 12 heats a first material, preferably of a higher durometer operable to provide structural support to a U or C-like channel for mounting. Generally, the first material is heated to about 315 to 420° C. Preferably, to about 315 to 350° C. Most preferably, to about 370 to 420° C. The extrusion is then drawn through a die of the extruder for forming the structural member profile, e.g., with the U-shaped channel, and the extruded material is pulled by the first pulling device 20 along the longitudinal axis A to the first calibrator device 16. The first calibrator device 16, which is most preferably a vacuum calibrator coupled to the first cooling tank 18, forms the final profile of the structural member 102,202. Preferably, the structural member has a final U-shaped-like profile with at least one retention member 106,206, more preferably, a plurality of retention members.

Optionally, a secondary extruder 14 adjacent to the first extruder 12 is used to co-extrude a second extrusion, e.g., having the same and/or lower durometer than the first extrusion, for melt bonding a second profiled extrusion onto the first extrusion substantially immediately upon exiting the first extruder 12, or substantially contemporaneous with the first extrusion, and prior to the first calibrator device 16 where the final profiled shape is formed, e.g., profile comprising a U-shaped structural member with a melt bonded segment extending therefrom and/or a slip coating thereon. By way of non-limiting example, the at least one retention member 106,206 can be formed onto the structural member 102,202 by the secondary extruder 14. It is understood that, alternatively, the at least one retention member 106,206 can be formed, and pressure and heat bonded downstream by the downstream extruder 22 or secondary downstream extruder 24.

After exiting the first calibrator device 16 the extruded structural member has the desired final profile(s). However, the material is still heated and therefore pliable or otherwise susceptible to deformation until it is cooled a desirable amount.

To cool and set in the desired profile of the structural member, and any secondary features melt bonded thereto and/or slip coating, as the extrusion is pulled through the calibrator 16, it is immediately drawn through the at least one first tank 18 containing a cooling medium, preferably cooled water, by the first pulling device 20. The cooling medium can directly contact the walls on the outer and inner surfaces of the first extrusion profile. Generally, the first tank 18 cools the extrusion an optimum amount suitable for maintaining the final profile of the structural member 102, 202, e.g., U-shaped profile. Preferably, the first tank 18 cools the extrusion to about 80 to 100° C. to set in the profile. Thus, the first calibrator device 16 in combination with the cooling bath of the at least one first tank 18 substantially locks in the final profile of the first extrusion.

In the next step of the method for making multiple durometer bulb seals, the at least one downstream extruder 22 heats a second material, preferably of a lower durometer operable to provide the bulb portion 104,204. Generally, the second material can be heated to about 315 to 420° C. Preferably, to about 315 to 350° C. More preferably, to about 370 to 420° C. It is understood that the heating of the second material is done simultaneous with the heating of the first material in the first main extruder 12 or staggered a predetermined amount of time suitable to provide uninterrupted or non-delayed heating and processing in the manufacture of the multiple durometer bulb seal. After the cooled extrusion exits the at least one first tank 18 and is pulled along the first pulling device 20, the first extrusion is then drawn through, most preferably, pulled directly adjacent to the downstream extruder 22, by the second pulling device 30. The downstream extruder 22 comprises a mandrel and a die to extrude and attach at least one bulb portion 104,204 onto the cooled structural member 102,202, e.g., attach melt bond points under pressure, as the extrusion continues to move downstream along the longitudinal axis A.

Optionally, at least one secondary downstream extruder 24 adjacent to the downstream extruder 22 can be used to co-extrude at least one addition bulb portion, and/or another extrusion such as the flange seal 208, and/or at least one retention member 106,206, and/or for melt bonding another alternative profiled extrusion onto to the structural member 102,202, and/or co-extruded slip coating of at least the bulb portion 104,204. The secondary downstream extruder 24 bonds an extrusion onto the structural member 102,202 and/or bulb portion 104,204 substantially immediately upon exiting the downstream extruder 22, or contemporaneously with the downstream extruder 22, and prior to the second calibrator device 26 where the final profiled shape is formed.

The extrusion is then pulled by the second pulling device 30 along the longitudinal axis A to the at least one second calibrator device 26. The second calibrator device 26, which is preferably a vacuum calibrator operably coupled to the second cooling tank 28, forms the final profile of the at least one bulb portion 104,204. Preferably, the at least one bulb portion 104,204 has a final closed bulb profile.

After exiting the second calibrator device 28 the extruded structural member has the desired final profiles of the bulb seal 100,200. However, the material extruded onto the structural member 102,202, e.g., the bulb portion 104,204 and any flange 208, is still heated and therefore pliable or otherwise susceptible to deformation until it too is cooled a desirable amount.

To cool and set in the desired profile of the bulb seal 100,200, as the extrusion is pulled through the calibrator 26, it is then immediately drawn through the at least one second tank 28 containing a cooling medium, preferably cooled water, by the pulling device 30. Generally, the second tank 28 cools the extrusion an optimum amount suitable for maintaining the final profile of the bulb seal 100,200. Preferably, the second tank 28 cools the extrusion to about 80 to 100° C. to set in the profile. Thus, the second calibrator device 26 in combination with the cooling bath of the at least one second tank 28 substantially locks in the final profile of the first extrusion. The rearward and forward wall of the at least one first and second tank 20,28 have a centrally located recess cut out of the wall for guiding the extrusion through the tank at a desired height and preventing an undesired amount of lateral movement of the extrusion therein.

After the cooled bulb seal 100,200 exits the at least one second tank 28 and is pulled along the second pulling device 30, the cutting device 32 cuts the bulb seal 100,200. The cutting device 32 cuts the bulb seal 100,200 extrusion to a predetermined desired length for the final bulb seal 100,200 product, e.g., cut to length for a window weatherstrip. Preferably, the method provides an in-line arrangement for performing in-line processing steps with pulled material moving in a forward direction toward this at least one cutting device 32.

Most preferably, the first pulling device 20 and/or second pulling device 32 each has at least two rotating belt devices that receive the extruded material therebetween. Both of the rotating belt devices rotate around an elongated hub parallel to the longitudinal axis. Both of the rotating belt devices has at least one, most preferably at least two, cylindrical hubs coupled to a motor for rotation about an axis transverse to the longitudinal axis A, which causes the belt to rotate thereby pulling the extruded material downstream frictionally engaged between the at least two rotating belt devices. Optionally, a cylindrical rotating device for rotating to pull the extruded material directly resting thereon along the longitudinal axis A is additionally contemplated. Typically, the first pulling device 20 and/or second pulling device 32 are pullers or "haul offs", preferably, RDN, Gatto, Ferris or Novatec machines.

With respect to the multiple durometers used, the harder durometer material is, generally, about 40-70 Shore D, and, preferably, about 50 to 70 Shore D. The softer durometer materials are generally, about 35-85 Shore A, and, preferably about 55-65 Shore A.

Referring to FIGS. 4-6B generally, according to another embodiment, the method for making multiple durometer seals in accordance with the present invention comprises providing an upstream to downstream arrangement comprising at least one of each of a first main extruder 312, first calibrator device 316, first cooling tank 318, pulling device 320, downstream extruder 322, second calibrator device 326, and second cooling tank 328. The method is performed with in-line processing steps arranged generally along a longitudinal axis A. According to an embodiment of the present invention the method further comprises providing at least one of each of a second pulling device 330 and cutting device 332 along the longitudinal axis A downstream from the second cooling tank 328. Optionally, the method further comprises additionally providing at least one of either of a secondary extruder 14 and/or secondary downstream extruder 24.

The method is performed with in-line processing steps upstream to downstream arranged generally along the longitudinal axis A with pulled material moving in a forward direction toward the at least one cutting device 332, as indicated generally by the arrows along axis A in FIG. 4.

The upstream process typically includes a harder/stiffer material being extruded through the tool, first main extruder 312, then cooled with a vacuum and chilled water sizer or calibrator. Preferably, the harder material being processed from the first main extruder 312 into the first calibrator 316, most preferably a vacuum calibrator, is pulled though the first cooling tank 318. The extrudate is pulled down the line with the first pulling device 320 or "puller" that is run at a precise predetermined speed, the harder material being cooled as it travels downstream by the puller to the downstream process. The harder material goes into the pulling device 320 and is fed into the downstream extrusion process. The downstream process is the portion of the process where predetermined alternative materials and/or additional features are applied to the harder base material, e.g., fins, bulbs, grippers, and/or any other features required in the parts configuration depending on the particular application.

FIG. 5B depicts an exemplary seal of the present invention generally shown at 400. The seal is a multiple durometer door belt seal 400, however, it is understood that the seal can be any other type of seal without departing from the scope of the present invention. FIG. 5A depicts the doorbelt section upstream profile before the downstream application of additional features.

The seal 400 has at least one structural member generally shown at 402 and at least one additional feature which is/are sealing portion(s), manufactured in accordance with the method of the present invention. In this embodiment, the sealing portion includes at least one fin 408 and at least one flange 410, preferably a pair of flanges 410. It is understood that more or less and/or alternative additional features are contemplated without departing from the scope of the present invention. The structural member 402 is generally U-shaped for mounting to a component therein. The structural member 402 has a higher durometer than the fin 408 and flange(s) 410.

The fin 408 and flange(s) 410 have the same or different durometer from one another, preferably, the same. The fin 408 and flange(s) 410 are extruded onto the structural member 402 such that a sealing function and/or wiping function is provided by each being in contact with a motor vehicle surface relative to an opening to help prevent moisture and debris from entering through the motor vehicle opening.

Optionally, the structural member 402 also has the additional features of a plurality of retention members 406 for receiving mounting features of the motor vehicle part edge or flange. The retention members 406 can have opposing offset and angled barbs, grippers, protrusions, and the like for gripping mounting features of the motor vehicle component edge or flange. These retention members 406 are also extruded onto the structural member 402. Preferably, extruded by a secondary extruder, e.g., 14 or 24, most preferably, downstream application by secondary extruder 24 adjacent the downstream extruder 322. The retention members 406 can have the same or different durometer than the structural member 402, preferably, lower than the structural member 402. The retention members 406 can also have the same or different durometer than the fin 408 and/or flange(s) 410, preferably higher than the fin 408 and/or flange(s) 410.

FIG. 6B depicts another exemplary seal of the present invention generally shown at 500. The seal is a multiple durometer door belt seal 500, however, it is understood that the seal can be any other type of seal without departing from the scope of the present invention. FIG. 6A depicts the doorbelt section upstream profile before the downstream application of additional features.

The seal 500 has at least one structural member generally shown at 502 and at least one additional feature which is/are sealing portion(s), manufactured in accordance with the method of the present invention. In this embodiment, the sealing portion includes at least one fin 508 and at least one flange generally indicated at 510. The flange 510 has an arcuate seal 512. It is understood that more or less and/or alternative additional features are contemplated without departing from the scope of the present invention. The structural member 502 is generally U-shaped for mounting to a component therein. Preferably, a lip seal like depicted is also integrally formed on the structural member 502 to contact a sidewall. The structural member 502 has a higher durometer than the fin 508 and flange 510.

The fin 508 and flange 510 have the same or different durometer from one another, preferably, the same. The fin 508 and flange 510 are extruded onto the structural member 502 such that a sealing function and/or wiping function is provided by each being in contact with a motor vehicle surface relative to an opening to help prevent moisture and debris from entering through the motor vehicle opening.

Optionally, the structural member 502 also has the additional features of a plurality of retention members 506 for receiving mounting features of the motor vehicle part edge or flange. The retention members 506 can have opposing offset and angled barbs, grippers, protrusions, and the like for gripping mounting features of the motor vehicle component edge or flange. These retention members 506 are also extruded onto the structural member 502. Preferably, extruded by a secondary extruder, e.g., 14 or 24, most preferably, downstream application by secondary extruder 24 adjacent the downstream extruder 322. The retention members 506 can have the same or different durometer than the structural member 502, preferably, lower than the structural member 502. The retention members 506 can also have the same or different durometer than the fin 508 and/or flange 510, preferably higher than the fin 508 and/or flange 510.

It is within the contemplation of the invention that the respective fin 408, 508 and flange seal 410, 510 can generally have the same durometer. It is also understood that alternative extruded structural member and feature portion arrangements suitable for mounting and sealing may be used, in particular, suitable shapes and configuration for providing a channeled structural mounting feature and a flange sealing configuration including a lower durometer than the structural member.

Generally, the extruded materials can be polypropylene, thermoplastic elastomer, soft TPE (Thermoplastic Elastomer), rigid PVC, flexible PVC, PVC vinyl, PVC rubber, ABS. Typically, the support member 102,202 is made from a structural ABS (Acrylonitrile Butadiene Styrene), polypropylene, or other plastic material suitable for providing a rigid structural member in accordance with the present invention. Typically, the fins, flanges or other additional features are made from TPE, and optionally, co-extruded slip coated or other plastic material suitable for providing a resilient seal. Preferably, the extruded materials are compatible material to melt bond to one another under pressure.

The first main extruder 312 heats a first material of a higher durometer operable to provide structural support to a mounting feature, e.g., at least one U or C-like channel, for mounting. Generally, the first material is heated to about 315 to 420° C. Preferably, to about 315 to 350° C. Most preferably, to about 370 to 420° C. The extrusion drawn through a die of the extruder 312 forms the structural member profile e.g., having the U-shaped channel, and the extrudate is pulled by the first pulling device 320 along the longitudinal axis A to the first calibrator device 316. The first calibrator device 316, which is most preferably a vacuum calibrator coupled to the first cooling tank 318, forms the final profile of the structural member, e.g., 402,502. Preferably, the structural member has a final generally U-shaped-like profile with at least one retention member, e.g., 406,506, more preferably, a plurality of retention members.

Optionally, a secondary extruder 14 (see FIG. 1) adjacent to the first extruder 312 can be used to co-extrude a second extrusion, e.g., having the same and/or lower durometer than the first extrusion, for melt bonding a second profiled extrusion onto the first extrusion substantially immediately upon exiting the first extruder 312, or substantially contemporaneous with the first extrusion, and prior to the first calibrator device 316 where the final profiled shape is formed, e.g., profile comprising a U-shaped structural member with a melt bonded segment extending therefrom and/or a slip coating thereon. By way of non-limiting example, the at least one retention member 406,506 can be formed onto the structural member 402,502 by the secondary extruder 14. Preferably, instead the at least one retention member 406, 506 is formed, and pressure and heat bonded downstream by the downstream extruder 322 or, alternatively, a secondary downstream extruder 24 (see FIG. 1) adjacent to the downstream extruder 322.

Upon exiting the first calibrator device 316 the extruded structural member has the desired final profile(s). However, the material is still heated and therefore pliable or otherwise susceptible to deformation until it is cooled further to a desirable amount.

To further cool and set in the desired profile of the structural member, and any secondary features melt bonded thereto and/or slip coating, as the extrusion is pulled through the calibrator 316, it is immediately drawn through the first cooling tank 318 containing a cooling medium, preferably cooled water, by the first pulling device 320. The cooling medium directly contacts the walls on the outer and inner surfaces of the harder extrusion profile. Generally, the first cooling tank 318 cools the extrusion an optimum amount suitable for maintaining the final profile of the structural member e.g., 402,502 generally U-shaped profile. Preferably, the first cooling tank 318 cools the extrusion to about 80 to 100° C. to set in the profile. Thus, the first calibrator device 316 in combination with the cooling bath of the cooling tank 318 substantially locks in the final profile of the first extrusion.

The harder material structural member is then fed to the "downstream extrusion" process portion. The downstream extruder 322 heats material, preferably, a second material having a lower durometer operable to provide the fin(s), flange portion(s), and/or other additional features. Generally, the second material is heated to about 315 to 420° C. Preferably, to about 315 to 350° C. More preferably, to about 370 to 420° C. After the cooled extrusion of harder material exits the at least one first cooling tank 318, it continues to be pulled by the first pulling device 320 and is drawn through and fed into the downstream extruder 322. The downstream extruder 322 includes a mandrel and a die to extrude and attach at least one of a fin, flange, and/or other suitable additional feature depending on the application, e.g., fin 408 and/or flange(s) 410, onto the cooled structural member e.g., attach melt bond points under pressure, as the continuous extrusion continues to move downstream along the longitudinal axis A pulled by the second pulling device 330.

Optionally, at least one secondary downstream extruder 24 adjacent to the downstream extruder 322 is used to co-extrude at least one additional feature, e.g., one or more bulbs, fin(s), flange(s), gripper(s), barb(s), and/or another extrusion for melt bonding another alternative profiled extrusion onto to the structural member 402,502, and/or co-extruded slip coating of at least one of these additional features. The secondary downstream extruder 24 is operable to bond an extrusion onto the extrudate substantially immediately upon exiting the downstream extruder 322, or contemporaneously with the downstream extruder 322, and prior to the second calibrator device 326 where the final profiled shape is formed.

The downstream process typically includes application of soft flexible materials. The material being extruded through the tool(s) are then cooled with a vacuum and chilled water sizer or calibrator. Preferably, the flexible material being processed from the downstream extruder 322, and secondary downstream extruder(s) 24 if used, into the second calibrator 326 is pulled along the longitudinal axis A though the second cooling tank 328 by the second pulling device 330 that is run at the precise predetermined speed. The second calibrator device 326, which is preferably a vacuum calibrator operably coupled to the second cooling tank 328, forms the final profile of the at least one additional feature.

After exiting the second calibrator device 328 the extruded features have the desired final profiles, e.g., of fins, flanges or others. However, the material is still heated and therefore pliable or otherwise susceptible to deformation until it is cooled a desirable amount.

To cool and set in the desired profile of the seals 400,500, as the extrusion is pulled through the second calibrator 326, it is then immediately drawn through the at least one second cooling tank 328 containing a cooling medium, preferably cooled water, by the pulling device 330. Generally, the second tank 328 cools the extrusion an optimum amount suitable for maintaining the final profile of the seals 400,500. Preferably, the second tank 328 cools the extrusion to about 80 to 100° C. to set in the profile. Thus, the second calibrator device 326 in combination with the cooling bath of the at least one second cooling tank 328 substantially locks in the final profile of the extrusion. Optionally, the rearward and forward wall of the at least one first and second tank 320,328 have a recess cut out of the wall for guiding the extrusion through the tank at a desired height within the tank(s) and preventing an undesired amount of lateral movement of the extrusion therein.

After the cooled extrusion exits the at least one second cooling tank 328, it continues to be pulled by the second pulling device 330 and is drawn through and fed to the cutting device 332, which cuts the seals 400,500. The cutting device 332 cuts the seals 400,500, e.g., door belt seals, to a predetermined desired length for the final seals 400,500 product. The method provides an in-line arrangement for performing in-line processing steps with pulled material moving in a forward direction toward this at least one cutting device 332.

Most preferably, the first pulling device 320 and/or second pulling device 332 have at least two rotating belt devices that receive the extruded material therebetween. Both of the rotating belt devices rotate around an elongated hub parallel to the longitudinal axis. Both of the rotating belt devices have at least one, most preferably at least two, cylindrical hubs coupled to a motor for rotation about an axis transverse to the longitudinal axis A, which causes the belt to rotate thereby pulling the extruded material downstream frictionally engaged between the at least two rotating belt devices. Optionally, a cylindrical rotating device for rotating to pull the extruded material directly resting thereon along the longitudinal axis A is additionally contemplated. Typically, the first pulling device 320 and/or second pulling device 332 are pullers or "haul offs", preferably, RDN, Gatto, Ferris or Novatec machines. Alternative pulling devices are contemplated depending on the particular application.

With respect to the multiple durometers used, the harder durometer material is, generally, about 40-70 Shore D, and, preferably, about 50 to 70 Shore D. The softer durometer materials are generally, about 35-85 Shore A, and, preferably about 55-65 Shore A. Alternative durometers are contemplated depending on the particular application.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A method for making seals, comprising
   providing an upstream/downstream system, where the upstream portion includes at least one first main extruder, at least one first calibrator device, and at least one first cooling tank; and, where the downstream portion includes at least one downstream extruder, at least one second cooling tank, and at least one pulling device;
   providing at least one second calibrator device coupled to said second cooling tank, wherein said at least one first calibrator device and/or said at least one second calibrator device is/are a vacuum calibrator;
   extruding a first material with said at least one first main extruder to form a structural member;
   pulling said structural member through said first calibrator device and said first cooling tank, forming a final profile of said structural member;
   extruding a second material with said at least one downstream extruder, forming at least one additional feature for bonding to said structural member, said second material having a different durometer than said first material;
   bonding said at least one additional feature to said structural member;
   pulling said structural member with said at least one additional feature using said pulling device through said second calibrator device and second cooling tank, forming a final profile of said at least one additional feature; and
   cutting said seals to a predetermined length.

2. The method for making seals of claim 1, wherein said at least one additional feature is selected from the group consisting of at least one fin, bulb, flange, lip gripper, barb, and combinations thereof.

3. The method for making seals of claim 2, wherein a plurality of the additional features are formed.

4. The method for making seals of claim 3, wherein none of the plurality of the additional features is a bulb.

5. The method for making seals of claim 4, wherein said seal is a doorbelt seal, and, said additional features are formed of soft flexible material and said structural member is formed of harder material.

6. The method for making seals of claim 1, further comprising cooling said structural member in a cooling medium located in said first cooling tank to about 80 to 100° C., and/or, cooling said structural member with said at least one additional feature in said second cooling tank cools the final seal profile to about 80 to 100° C.

7. The method for making seals of claim 1, further comprising providing a first pulling device in said upstream portion for pulling the structural member through said upstream portion and feeding said structural member to said downstream portion.

8. The method of making seals of claim 1, where the first material has a higher durometer than the second material.

9. The method if making seals of claim 8, where said higher durometer is about 40-70 Shore D.

10. The method for making seals of claim 1, wherein bonding said at least one additional feature to said structural member further comprises melt bonding to one another under pressure.

11. The method for making seals of claim 1, wherein said upstream/downstream system is an in-line arrangement.

12. The method for making seals of claim 1, further comprising first heating said first material and/or said second material, respectively, in said at least one first extruder and downstream extruder to about 315 to 420° C.

13. The method for making seals of claim 1, further comprising providing at least one cutting device to cut said seals to the predetermined length.

14. The method for making seals of claim 1, wherein said at least one additional feature is a sealing portion.

15. The method for making seals of claim 14, further comprising
   providing at least one secondary extruder located adjacent to said at least one first extruder; co-extruding a second extrusion and/or slip coating at the same time as said at least one first extruder, and melt bonding said second extrusion and/or slip coating onto said structural member, wherein said structural member and said second extrusion and/or slip coating are cooled in said cooling medium of said at least one first cooling tank;
   and/or
   providing at least one secondary downstream extruder located adjacent to said at least one downstream extruder, and, co-extruding a second extrusion and/or slip coating and melt bonding said second extrusion and/or slip coating onto said sealing portion and/or structural member, wherein said structural member, sealing portion, and said second extrusion and/or slip coating are cooled in said cooling medium of said at least one second cooling tank.

16. A method for making multiple durometer seals, comprising,
providing an in-line system having an upstream portion, the upstream portion including at least one of each of a first main extruder, first calibrator device, first cooling tank and first pulling device;
providing a downstream portion that is part of the system, the downstream portion including at least one of each of a downstream extruder, second calibrator device, second cooling tank, second pulling device, and cutting device, wherein said first and/or second calibrator device is/are a vacuum calibrator;
providing a first material;
providing a second material having a lower durometer than said first material;
heating the first material to about 315 to 420° C. in said first main extruder;
extruding said first material creating a structural member;
pulling said structural member using said first pulling device through said first calibrator device and first cooling tank to cool said structural member a predetermined amount and set a final profile of said structural member;
delivering said structural member to said downstream portion;
extruding said second material creating at least one additional feature that is a sealing portion;
bonding said at least one additional feature and structural member;
pulling said bonded structural member and at least one additional feature using said second pulling device through said second calibrator device and second cooling tank, to cool a predetermined amount and form a final profile of said seal; and
feeding said seal to said cutting device using said second pulling device and cutting said seal to a predetermined length.

17. The method for making multiple durometer seals of claim 16, further comprising providing at least one secondary extruder located adjacent to said first extruder, co-extruding a second extrusion and/or slip coating of said first material or a third material with said at least one first extruder and melt bonding said second extrusion and/or slip coating onto said structural member, wherein said structural member and said second extrusion and/or slip coating are cooled in a cooling medium of said at least one first cooling tank.

18. The method for making multiple durometer seals of claim 16, wherein said first material and/or second material is selected from the group consisting of polypropylene, thermoplastic elastomer, soft thermoplastic elastomer, rigid PVC, flexible PVC, PVC vinyl, PVC rubber, and structural acrylonitrile butadiene styrene.

* * * * *